United States Patent [19]

Vincent

[11] Patent Number: 4,881,179
[45] Date of Patent: Nov. 14, 1989

[54] METHOD FOR PROVIDING INFORMATION SECURITY PROTOCOLS TO AN ELECTRONIC CALENDAR

[75] Inventor: James P. Vincent, Arlington, Tex.

[73] Assignee: International Business Machines Corp., Armonk, N.Y.

[21] Appl. No.: 166,572

[22] Filed: Mar. 11, 1988

[51] Int. Cl.[4] ............................................. G06F 15/40
[52] U.S. Cl. .................................. 364/518; 364/521; 368/41
[58] Field of Search ................ 340/756; 364/521, 518, 364/522; 368/41, 28; 380/4, 55, 59

[56] References Cited

U.S. PATENT DOCUMENTS

| | | | |
|---|---|---|---|
| 4,380,009 | 4/1983 | Long et al. | 340/825.55 |
| 4,626,836 | 12/1986 | Curtis et al. | 340/706 |
| 4,713,753 | 12/1987 | Boebert et al. | 364/200 |
| 4,713,780 | 12/1987 | Schultz et al. | 364/514 |
| 4,769,796 | 9/1988 | Levine | 368/29 |

Primary Examiner—Gary V. Harkcom
Assistant Examiner—Phu K. Nguyen
Attorney, Agent, or Firm—R. E. Cummins

[57] ABSTRACT

A method of controlling the unauthorized disclosure of classified data that is used to describe an event that has been calendared in an electronic calendaring application of an interactive information handling system in which the calendar owner assigns a security classification to an event as it is being calendared. The classification assigned is pre-established by an information security protocol that is either unique to the calendar function or a more comprehensive information security system for the organization. The security classes are pre-established by the system. When the calendar data is presented in a format that allows event descriptions to be readable such as when a day calendar is viewable on the display terminal or in a printed copy, an overall security label is displayed and printed out when the display is converted to hard copy. The period covered by the security label generally corresponds to the period that is selected for viewing. The security classification displayed is the highest security class of any of the event descriptions that are displayed. Data structures are established for each calendar entry which store the data in the system. These data structures are scanned to determine the overall classification that is displayed for the day calendar. Since a readable security classification label is automatically applied, regardless of whether the calendar presentation is on the display screen or in hard copy, all of the requirements of the established information security system are met and the electronic calendaring application need not be treated as an exception to the information security system. The method allows each calendar user on the system that has an assigned permission level to view classified event descriptions at or below his or her assigned security level with a security label automatically displayed or printed.

10 Claims, 5 Drawing Sheets

```
34                          MAIN MENU
31   PRINT    DIR    CHANGE_DIR    PROFILE
27
                 1. MAIL

2. LIBRARY

3. PHONE DIRECTORY
              ┌─ ─ ─ ─ ─ ─ ─ ─ ─ ─ ─┐
              │  4. CALENDAR        │ ─ 35
              └─ ─ ─ ─ ─ ─ ─ ─ ─ ─ ─┘
                 5. SPREADSHEET

6. WORDPROCESSOR

33 ENTER A SELECTION

32    F1=HELP         F10=EXIT
```

FIG. 3

```
34                        DAY CALENDAR           ****CONFIDENTIAL****  60
31   VIEW  MOVE  COPY  ADD  DELETE  CALENDAR  FIND  PROOF  PRINT  EXIT
27       DATE  FEB. 29 88    CALENDAR FOR I.M. USER
                         CMD START   END   SEC- 51        DESCRIPTION  49

8:00am             __9:00am 10:00am  U Meeting with Don Smith about E3
      8:30am             __                  Editor. His office.
  38- 9:00am  -42        __10:00am 12:00n  U Department meeting to update mem-
      9:30am             __                  bers on the move to new offices
     10:00am             __                  and general update on work status.
     10:30am             __11:00am 12:30pm C Design Group Review              Th
     11:00am             __                  6F13
     11:30am             __                  This meeting is to review the work
     12:00n      Th      __                  thats been going on for our 60 day
     12:30pm 58          __  47      48      work effort. Bring accomplishments
      1:00pm             __                  and concerns. Only 10 more days to
      1:30pm             __                  go. For some that's good, for
      2:00pm             __                  others well .....
      2:30pm             __                  Please don't forget to keep your
      3:00pm             __                  people updated for this meeting
      3:30pm             __                  and the results from it.

33 Enter Calendar Name    38      39U

32    F1=HELP   F3=CANCEL   F7=PREV DAY  F8=NEXT DAY  F10=EXIT
```

```
34                      DAY CALENDAR        ****SECRET*****  60
31  VIEW  MOVE  COPY  ADD  DELETE  CALENDAR  FIND  PROOF  PRINT  EXIT
27       DATE  FEB. 29 88    CALENDAR FOR I.M. USER
                         CMD START    END    SEC- 51      DESCRIPTION    49

8:00am                __2:00am  3:00pm  C Work group meeting 07-F13 to dis-
    8:30am                  __                cus patent coverage of project.
    9:00am                __4:00pm  4:30pm  U Finish weekly report.
    9:30am                __5:00pm  6:00pm  S Meeting with security people to
   10:00am                  __                investigate loss of documents.
   10:30am                __8:00pm          P Dinner meeting with recruiter    Th
   11:00am                  __
   11:30am                  __
   12:00n   Th  41          __
   12:30pm                  __ 47    48
    1:00pm                  __
    1:30pm       40         __
    2:00pm                  __
    2:30pm                  __
    3:00pm  43              __
38  3:30pm                  __

33 Enter Calendar Name

32      F1=HELP    F3=CANCEL    F7=PREV DAY  F8=NEXT DAY  F10=EXIT
```

FIG. 4B

```
34                      DAY CALENDAR        CONFIDENTIAL**  60
31  VIEW  MOVE  COPY  ADD  DELETE  CALENDAR  FIND  PROOF  PRINT  EXIT
27       DATE  FEB. 29 88    CALENDAR FOR I.M. USER
                         CMD START    END    SEC- 51      DESCRIPTION    49

8:00am                __2:00am  3:00pm  C Work group meeting 07-F13 to dis-
    8:30am                  __                cus patent coverage of project.
    9:00am                __4:00pm  4:30pm  U Finish weekly report.
    9:30am                __5:00pm  6:00pm    ACCESS PERMISSION REQUIRED
   10:00am                  __
   10:30am                __8:00pm            ACCESS PERMISSION REQUIRED      Th
   11:00am                  __
   11:30am                  __
   12:00n   Th  41          __
   12:30pm                  __ 47    48
    1:00pm                  __
    1:30pm       40         __
    2:00pm                  __
    2:30pm                  __
    3:00pm  43              __
38  3:30pm                  __

33 Enter Calendar Name

32      F1=HELP    F3=CANCEL    F7=PREV DAY  F8=NEXT DAY  F10=EXIT
```

FIG. 5

| DATE | CALENDAR NAME | CALENDAR USER | START TIME | END TIME | SEC-UR'Y | EVENT DESCRIPTION |
|---|---|---|---|---|---|---|
| 022988 | MAIN | USER IMA | 9:00am | 10:00am | | Meeting with Don Smith about E3 Editor. His office. |
| 022988 | MAIN | USER IMA | 10:00am | 12:00n | | Department meeting to update members on the move to new offices and general update on work status |
| 022988 | MAIN | USER IMA | 11:00am | 12:30pm | | Design Group Review<br>6F13<br>This meeting is to review the work thats been going on for our 60 day work effort. Bring accomplishments and concerns. Only 10 more days to go. For some that's good, for others well .....<br>Please don't forget to keep your people updated for this meeting and the results from it. |

<u>34</u>   DISPLAY OR PRINT OWNER CALENDAR

<u>31</u>   PRINT   DISPLAY CHANGE-DIR   PROFILE

<u>27</u>

TYPE THE DATA RANGE DESIRED, CHOOSE CENSORSHIP IF DESIRED THEN SELECT PRINT OR DISPLAY ON COMMAND BAR

START DATE (mm/dd/yy) __/__/__        (DEFAULT IS TODAY)
END DATE   (mm/dd/yy) __/__/__        (DEFAULT IS TODAY)

CENSORSHIP DESIRED ?
    IF YOU WANT ANY EVENT DESCRIPTION CENSORED, SELECT THE LEVEL OF
    CENSORSHIP DESIRED:

SHOW UNCLASSIFIED DESCRIPTIONS? (Y/N)    __   (DEFAULT IS Y)
    SHOW CONFIDENTIAL DESCRIPTIONS? (Y/N)    __   (DEFAULT IS Y)
    SHOW SECRET DESCRIPTIONS        (Y/N)    __   (DEFAULT IS N)
    SHOW PERSONAL DESCRIPTIONS      (Y/N)    __   (DEFAULT IS N)

<u>33</u> ENTER A SELECTION

<u>32</u>   F1=HELP          F10=EXIT

FIG. 7

METHOD FOR PROVIDING INFORMATION SECURITY PROTOCOLS TO AN ELECTRONIC CALENDAR

CROSS-REFERENCES TO RELATED APPLICATIONS

1. Co-pending application Ser. No. 008,039, filed Jan. 29, 1987, entitled "Electronic Calendaring Method to Establish Calendar Floating Triggers for Calendared Events and Processes" and assigned to the assignee of this application is directed to an electronic calendaring method in which a calendar owner can selectively trigger a predefined action and response to detecting one or more criteria related to the calendar event that has previously been defined and entered into the system.

2. U.S. Pat. No. 4,807,154, issued 2/21/89 Ser. No. 008,033, filed Jan. 29, 1987, entitled "Method For Developing Automatic Replies in an Interactive Electronic Calendaring System," and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

3. Co-pending application Ser. No. 008,034, filed Jan. 29, 1987 entitled "Method For Concurrently Displaying Entries From a Plurality of Different Electronic Calendars Based on Interactively Entered Criteria," and assigned to the assignee of the present application is directed to an electronic calendaring method in which a calendar owner can display a set of calendar entries from different calendars which have an interrelationship that the user defines by data that is entered into the system interactively.

4. Co-pending application Ser. No. 008,249, filed Jan. 29, 1987, entitled "Method For Automatically Reconciling Entries on Two Copies of Independently Maintained Electronic Calendars," and assigned to the assignee of the application is directed to an electronic calendaring method in which a calendar owner who keeps a detached personal copy of his master calendar can automatically reconcile the calendar entries that have been made on each calendar copy, independently of the other since the last time the detached copy was made and interactively resolve calendar event conflicts.

5. Co-pending application Ser. No. 008,038, filed Jan. 29, 1987, entitled "Electronic Calendaring Method Which Provides for Automatic Assignment of Alternates In Requested Events," and assigned to the assignee of this application is directed to an electronic calendaring method in which a calendar owner, who receives a request to participate in a calendared event originated by another calendar owner, can assign an alternate to the event that will be designated in the automatic response which reflects the assignment of an alternate to the event. The assignment of the alternate is based on the relationship of the information that accompanies the request and criteria that the calendar owner has pre-established for each potential alternate.

6. U.S. Pat. No. 4,807,155 issued 2/21/89 Ser. No. 008,036, filed Jan. 29, 1987, entitled "Electronic Calendaring Method for Automatic Confirmation of Resource Availability During Event Calendaring", and assigned to the assignee of this application is directed to an electronic calendaring method in which a calendar owner, when calendaring an event such as a meeting, which requires, in addition to a meeting room, such articles as a protector, video conferencing equipment, etc., automatically receives confirmation that requested articles are available and reserved for the calendared meeting event.

7. Co-pending application Ser. No. 07/178,725 filed concurrently herewith in the name of Murray et al and entitled "Method For Presenting Electronic Calendar Information in an Interactive Information Handling System", is directed to a method of displaying day calendar data in which the data is presented in two different formats simultaneously.

BACKGROUND OF THE INVENTION

1. Field of Invention

This invention relates in general to methods for maintaining electronic caalendars for end users in a multi-terminal data processing system and in particular to a method of controlling the unauthorized disclosure of classified data that is used to describe an event that has been calendared.

2. Description of the Related Art

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring methods and systems do hve an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network that has been established to permit the users to interact with each other and with data maintained on the data processing system. In this environment, a user at a terminal or workstation can send a message to one or more of the other users on the network and is notified when the addressees has received and read the message.

In most of these environments, each user generally maintains a separate calendar, and in many of these environments the reason for the interaction with each other quite often generally involves reference to respective calendars. A considerable amount of time is therefore spent in many organizations, with people checking and rearranging their calendars to accommodate various events such as meetings, presentations, etc. In this environment, the calendar systems and methods have progressed to the point where a person who is called a meeting can, at least, review the calendars of other users on the system that he intends to invite to a meeting to determine whether a given time period is available on the respective calendars of the perspective attendees. The cross-referenced applications describe various improvements to electronic calendaring methods for increasing productivity and making the overall system more appealing to the calendar owner by providing functions that the calendar owner came to expect and rely on when his calendar was being kept manually.

A problem that still persists in multi-user systems involves the security of the information that calendar users enter into their calendars and which is generally available for viewing by other users of the system. In some prior art systems the data security problem is inherently minimized since the amount of space available to describe the event that is calendared is very limited and often results in very cryptic descriptions. However in calendaring systems as described in cross-referenced application Ser. No. (DA987027), the amount of space allowed to describe an event in theory is unlimited. In this type of system the space allocated for an event description is independent of the time period of the event. There is therefor a tendency to have detailed descriptions, which are accompanied by relevant comments, annotations, reminders and messages to other persons, which are sometimes sensitive from either a personal, personnel or information security standpoint.

In some systems, the problem is addressed by limiting access to each user's calendar to selected individuals. In certain situations, this solution may be justified, but it is very impractical as a general solution to the problem because in many systems access permission is not selective as to the type of calendar data. The administration of the access permission process therefore becomes very unwieldily. As a result, two situations generally develop depending on the user's perception of security needs. One set of users who have no concern for document security directives will enter classified data into their calendar entries and hope that the formation will not be compromised when another user on the system is viewing the calendar to determine the first user's available free time. Another set of users will just avoid making an entry if the information is sensitive and will have a manual backup calendar system for such entries. Calendar entries of a personal nature also follow a similar scenario. The overall integrity of the system is therefore lessened and users become reluctant to participate.

The prior art does disclose calendaring systems in which calendared events are assigned security classifications at the time they are calendared. By assigning each calendar user on the system access to classified event descriptions at or below below his or her assigned security level, the system can now control access at a much finer granularity. Event descriptions which have been classified above the security level of the viewer of a day calendar are censored on the presentation screen and printout. This results in better security for entries which are personal to the calendar owner and entries which are sensitive from the security standpoint. Users are therefore less reluctant to make full use of the electronic calendar system.

However two data security problems still remain in these types of systems. The first problem arises from the fact that most all security systems require a document to have a security label which designates the security classification of the information contained in the document. When a user requests a copy of his calendar to be displayed or printed out, there is no security label automatically attached or associated with the copy. The user must remember to add one manually, which task is easily over looked if the copy is printed, and generally not permitted if the copy is merely displayed. The calendaring system is then viewed as a potential source of exposure of sensitive data.

The other problem that still exists in calendaring systems which only allow users access to classified data that corresponds to their access permission levels, is that since the user is never prevented from viewing or printing all his own calendar entries regardless of their security classifications, no provision is made to allow the calendar owner to display or print his own calendar with entries above a designated security level deleted or censored.

The present invention is directed to a method to overcome the above described problems.

SUMMARY OF THE INVENTION

In accordance with the method of the present invention, provision is made for the calendar owner to assign a security classification to an event as it is being calendared. The classification assigned is pre-established by any information security protocol that is either unique to the calendar function or a more general information security system. The security classes are pre-established by the system and include for example such classes as PERSONAL, CONFIDENTIAL, RESTRICTED, SECRET, etc. When the calendar is accessed for viewing an overall security label is assigned to the presentation which is maintained when the presentation results in a printed copy. The period covered by the security label generally corresponds to the period that is selected for viewing. The security classification assigned to the period may be the highest class of any of the entires, and may even allow different classifications assigned to different entries to be combined when appropriate, e.g. PERSONAL AND CONFIDENTIAL. The user's day calendar presentation, for example, is therefore automatically classified by the system in accordance with the type of security classifications that the user has selected for events that were calendared for that day.

Data structures are established for each calendar entry which allow the entry of security classifications. These data structures are scanned to determine the highest assigned classification of the period. The highest security classification is displayed or printed out whenever a copy of the day calendar is displayed or printed.

The method permits the calendar owner to display or print out his calendar with events above a designated security classification deleted and with the overall security label corresponding to the highest classification of the remaining events that were not deleted. When the copy is displayed or printed at the request of a non-owner, only those events which match the access level of that non-user are displayed or printed along with the corresponding security label.

Since each viewable period is provided with a readable security classification label automatically, regardless of whether the calendar presentation is on the display screen or in hard copy, all of the requirements of the established information security system are met and the electronic calendaring application need not be treated as an exception to the information security system.

It is therefore an object of the present invention to provide an improved electronic calendaring method.

Another object of the present invention is to improve the security of an electronic calendaring system.

A further object of the present invention is to provide an electronic calendaring method in which security classifications are assignable to calendar entries and subsequently employed to set a security classification for a longer period.

A still further object of the present invention is to provide an improved electronic calendar method which provides an overall security classification label on each readable copy containing a calendar event description, which label is determined by the classifications of the calendar entries.

A still further object of the present invention is to provide an improved electronic calendar method which allows a calendar owner to selectively display or print calendar event descriptions having assigned security classifications below an access level determined by the calendar owner.

Objects and advantages other than those mentioned above will become apparent from the following description when read in connection with the drawing.

DESCRIPTION OF THE PREFERRED EMBODIMENT

Figure 1:
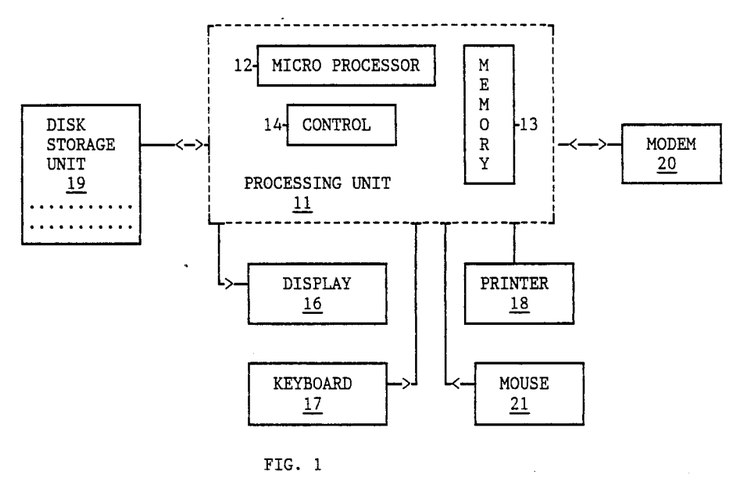
FIG. 1 is a block diagram of an interactive data processing terminal in which the electronic calendaring method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

The terminal shown in FIG. 1 further includes a printer 18, which functions to provide hard copy output of data developed or stored in the terminal. The model 20 functions to transfer data from the terminal of FIG. 1 to a host system through one or more communication links which may be a commercial type link or a dedicated communication link. The mouse 21 functions to position a selection cursor on the screen of the display device 16, and enter selection commands into the system.

Display device 16, keyboard 17, and mouse 21 together provide for the interactive nature of the terminal, in that in normal operation, the interpretation that the system gives to a specific keystroke by the operator depends, in substantially all situations, on what is being displayed to the operator at the point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

Figure 2:
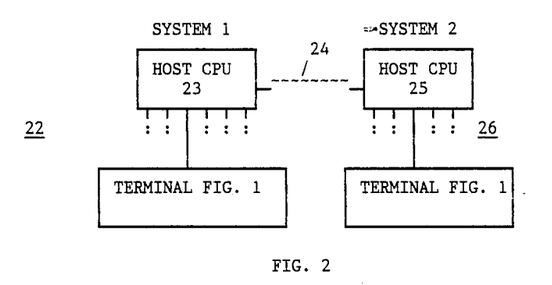
FIG. 2 is a block diagram of a network of terminals of the type shown in FIG. 1.

FIG. 2 illustrates a network 22 of interactive type workstations of the type shown in FIG. 1. As illustrated, the network includes a plurality of terminals which are interconnected with each other and to a host central processing unit 23, which in turn is connected via communication link 24 to a second host processing unit 25, which also connects to another network 26 of interactive workstations.

Functionally, the system operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description that there is only one individual assigned to each node on the network. It should further be assumed that conventional communication services are provided by the system.

The system shown in FIG. 2 processes information as various types of data objects such as text data objects, graphic data object, and calendar data objects. Each of these data objects are represented by a datastream which comprises a series of structured fields. The cross-referenced applications may be referred to for the details of the various calendar objects and the various data structures that are employed by the system in implementing the overall electronic calendaring process and the general inter-terminal communication process which is often referred to as the electronic mail function.

Figure 3:
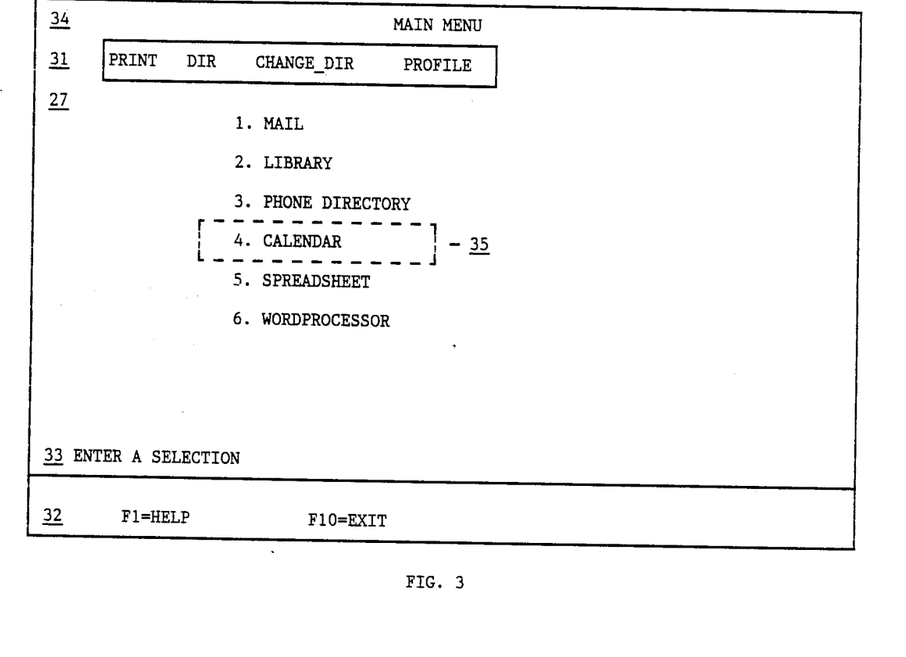
FIG. 3 is a screen presented to the calendar owner/operator after the terminal shown in FIG. 1 is initialized.

FIG. 3 is representative of the display panel that is presented to the user/operator immediately after the terminal is initialized. The content of this display screen is merely an example of the type of options that might be presented to the terminal user, and the overall functional areas of the screen which remain constant and are considered part of the user interface of the system.

It is assumed that the personal computer or terminal is provided with a display management system which uses a command bar for the selection of actions and a vertical scroll bar function which allows selected display screens to be scrollable under the control of a mouse.

The command bar portion of the screen shown in FIG. 3 is designated by referenced character 31. The commands that are shown for the panel are merely representative. The specific commands that are displayed on the command bar will vary depending on the information being displayed and the point in the task that is being performed. The user interface screen also includes a function key area 32 which allows the operator to request predetermined tasks or actions.

Generally the task assigned to a function key does not vary within a given application program or operating system. Some function keys have obtained a defacto standard such as function key F1 which is generally used to request the display of a "help" panel. The function key area is designated 32. A message area designated 33 is provided to display prompts or error messages from the system to the operator.

The top line 34 of the screen is used to designate the name of the application program and/or the screen name. In a multi-tasking system, an area may also be provided to indicate other tasks that are presently active which have been open and are executing in a background mode.

The main display area of the screen is designated 27 and as such is shown in FIG. 3 with a number of tasks which are selectable. For example, by moving the cursor 35 vertically to each line, which causes the task to be highlighted, and pressing the enter key, the highlighted task is selected. Other selection techniques described in the prior art may also be employed.

It is assumed for purposes of this description that the operator has just initialized the system and that the "Calendar" option is selected. The screen shown in FIG. 4A is then displayed.

Figure 4A:
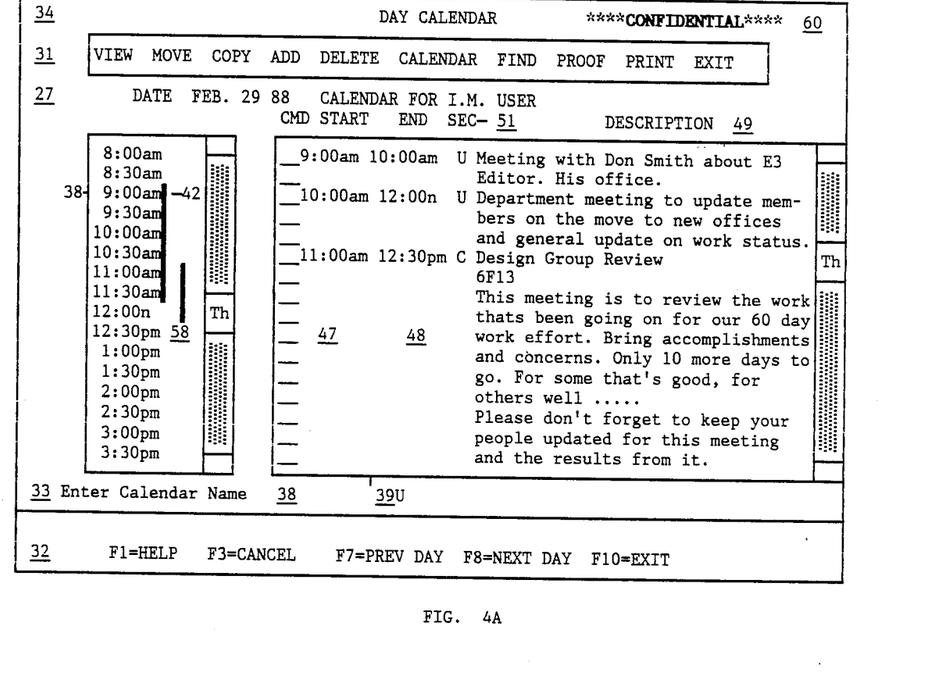
FIGS. 4A and 4B illustrate copies of the day calendar shown in FIG. 3.

The screen shown in FIG. 4A comprises a pair of separate but functionally interrelated viewpoints or windows 38 and 39. Area 38 has a time structured format in which each display line represents a fixed time period. The area or space between a pair of horizontally adjacent lines is allocated one time slot. As shown, each line or space between adjacent horizontal line represents a 30 minute time period or time slot. The height of the viewport 38 as shown, is 16 time slots. The viewport therefore covers an eight hour period. Time slots prior to 8:00 a.m. and after 4:30 p.m. may be provided, if desired, in which case the information is scrollable to bring these time slots into view.

A vertical scroll bar 40, including a thumb wheel 41, is provided at the right edge of the viewport 38 to permit a scrolling operation employing a mouse which first selects the thumb wheel 41 with a mouse-directed cursor and then drags the thumb wheel up or down in a vertical direction by moving the mouse. This operation causes the time slots to scroll either up or down. The third area 42 of the viewport is called the busy bar area. Its function is to map busy or committed time slots with a vertical busy bar which extends between the pair of horizontal lines that define the time slot. In practice, two separate busy bar columns are employed for the bar map so that any potential scheduling conflicts can be indicated since the busy bars in each column will overlap for the conflict period in an horizontal direction. Other techniques, such as assigning a blinking attribute to the portion of the bar representing the conflict, may also be employed if horizontal space is at a premium. Viewport 38 is also provided with its own cursor shown as a reversed video box 43 in FIG. 4B.

The second viewport 39 is called the descriptive area and includes a Start time column 47, an End time column 48, and a descriptive area 49. The function of area 39 is to display information in detail about a calendared event. The Start time of the event is entered in area 47 while the end time of the event is entered in area 48 and the text describing the event in the area 39. Area 39 does not, in theory, limit the amount of text that can be entered although in practice the system administrator will likely impose some practical maximum restraints like 15 lines. It is important to note, that the number of text lines consumed by the description is independent of the number of lines allocated to the time period scheduled for the event. For example, a description of an event calendared for one hour, may take ten lines and a description for an event calendared for an eight hour period may take one line.

The event description area includes two additional columns. The first column 50 is the command column labeled CMD in the display and the column 51 labeled SEC which is for a security designation for that entry. Each entry can be given a security classification by entering an appropriate designation in column 51. The calendaring system then permits each event description to be screened in accordance with some pre-established protocol.

The command column is employed to select the entry for some type of conventional text editing operation such as move, copy, delete, etc. Entries subject to the same editing action can be flagged with a predetermined symbol such as a backslash (\) so that multiple entries could be edited in one operation.

The busy bar map shown in the time structured format area is directly related to the event descriptions that are entered in the descriptive area. For example, when the 9:00 am to Noon event shown in FIG. 4A was entered into the system, the busy bar in column 42 was displayed. When the 11:00 am to 12:30 pm entry was entered, the busy bar 58 was displayed in the second column to signify a conflict of events for the period or time slots 11:00 am to Noon.

Figure 4B:
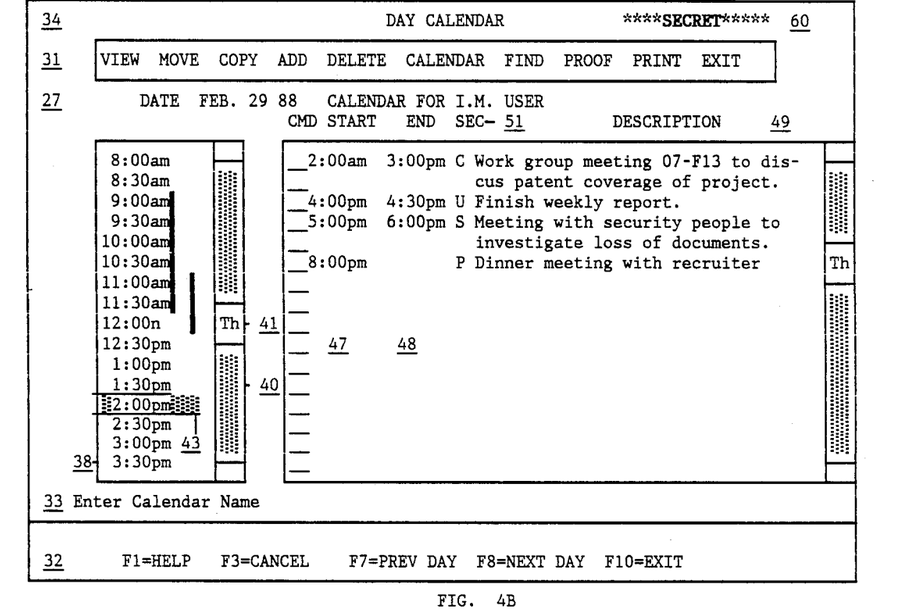

The format of the screen employed in the calendaring event process as shown in FIGS. 4A and 4B is the preferred format. However it should be understood that the method of the present invention may be implemented with other formats that allow an area to describe a calendared event and an area to enter a security classification for the event.

In the process of calendaring an event, the screen of FIG. 4A functions as the user interface to the system in that a blank line is selected in the descriptive area in response to a time slot in the viewport 38 being selected by the user. The details of how the system causes the information in viewport 39 to scroll to position the blank line can be found in the cross-referenced application Ser. No. 07/178,725. The blank line is positioned relative to the start times of previous entries and in accordance with the time slot selected in viewport 38. The user first enters the start and end times of the event being calendared into columns 47 and 48 respectively. A security classification is then entered into column 51.

For purposes of discussion it can be assumed that there are 4 possible security classifications that can be applied to an event description. These classifications are Secret, Confidential, Personal, and Unclassified. The number of classifications and their designations are not critical and the method of entering a selected classification may also vary. In the preferred embodiment the user merely needs to enter the first letter of the classification into the system when the cursor is in column 51, and the system recognizes the security classification assigned to the event description. After the entry in Column 51, the cursor is positioned to the start of the descriptive area and as the description is entered the data is wrapped to the next line or lines as the case may be. Entry of data is under the control of a full text editor so all of the conventional editing functions are available to the user. At the end of the description the user presses the enter key and the calendar entry process is concluded.

As shown in FIG. 4A the display screen includes an area 60 for the overall security label for the day calendar. The label "CONFIDENTIAL" that is displayed in area 60 is based on the highest security classification that has been assigned to events that are presently calendared and displayed. Whenever the day calendar is displayed or printed at the request of the calendar owner, all events are included unless the owner has specifically requested otherwise.

In the preferred embodiment it can be assumed that there are 5 levels of access permission not including the access permission level established for an owner to view his own calendar. The five levels are defined as follows:
1. No access; no data from the calendar may be seen.
2. Times only; only the times of calendared events may be seen, but no descriptions.
3. Unrestricted; all times of the events may be seen and the descriptions of those events that have an unclassified designation.
4. Confidential; same as 3, plus access to all event descriptions that have a Confidential classification
5. Personal; all times may be seen, Confidential and Secret descriptions may not be seen.

The method of the preferred embodiment of the present invention permits the classified entries to be censored to prevent a non-owner having access to the calendar from viewing calendar entries that have been assigned a security classification above Unclassified unless the non-owner has the appropriate level of access permission.

When servicing a request by a user to view the calendar of another user, the system automatically deletes any entry on the requested calendar view that is above the access permission level of the requestor. The overall security label applied is based on the remaining events that are displayed.

Figure 5:
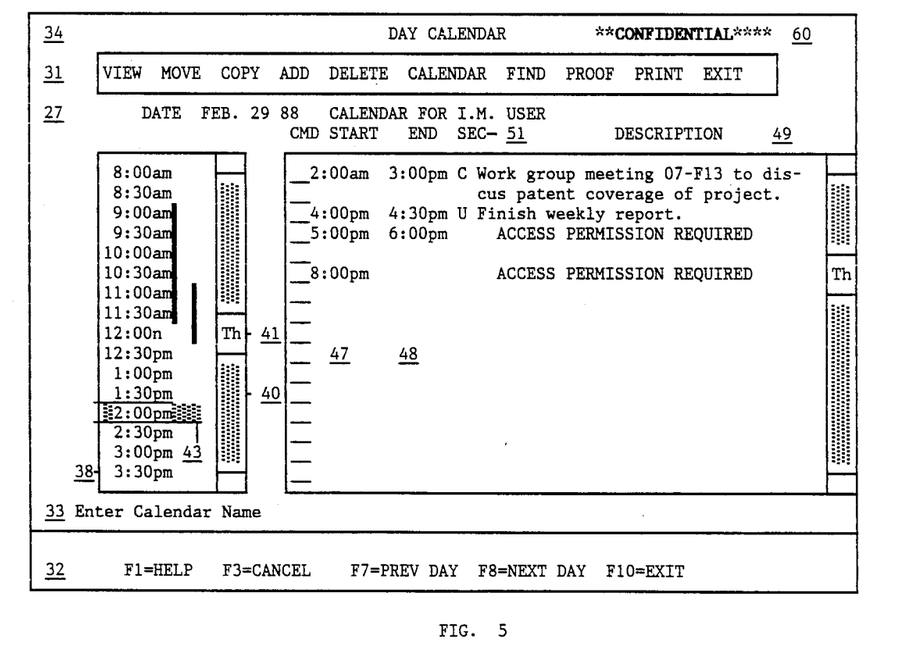
FIG. 5 is the screen shown in FIG. 4B with censored descriptions.

FIG. 5 represents the screen displayed to a non-owner who has requested a view of the day calendar of I.M. User that was shown in FIGS. 4A and 4B. The requesting non-owner has an access level of 3, so that all time periods having calendared events are shown and all descriptions except Secret and Personal are displayed. The descriptions of the later events have been replaced by a suitable message, such as "Access Permission Required".

The calendar owner may see all descriptions on his calendar. The calendar owner may also allow a specified person to have access to his calendar at a specified security level which may be different that the general access level that has been assigned to that person by the system. This function allows a calendar owner to grant access to his calendar to an administrative assistant or secretary.

Any of the prior art methods for establishing profiles for the calendar owner may be employed to obtain the identity i.e. user name, of the particular individual that has been granted special access to the owner's calendar and the specific level of access granted. The profile data is stored in the system so that a request to view a day calendar for example by a non-owner would be processed against the profile and against the list of individuals having access to calendars other than their own.

Figure 6:
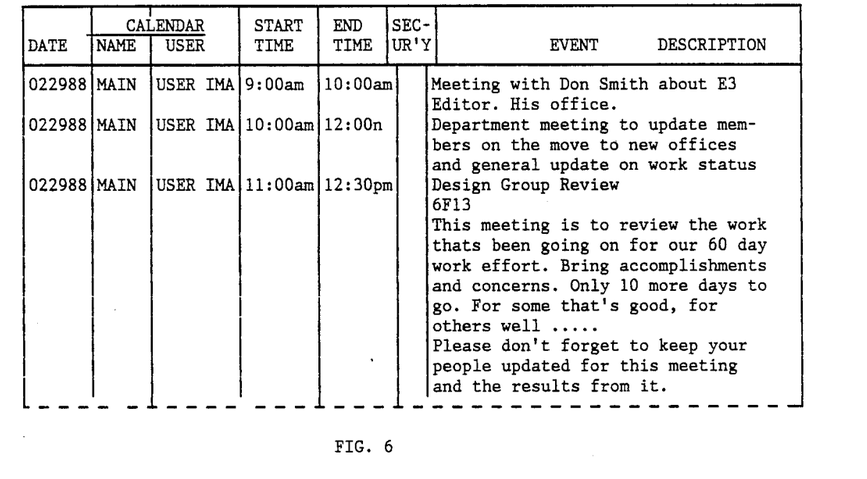
FIG. 6 is a data structure maintained by the system for storing calendared event information including assigned security classifications.

FIG. 6 illustrates the data structure that is employed by the system to store calendared event information. When a request to view a calendar is received by the system, the access permission level for the requestor is obtained from an Authorization file maintained by the system and along with the time period requested, is employed to extract calendar event data from the data structure of FIG. 6.

Since a calendar owner has unlimited access to his own calendar, his access security level is never used when the system services a request from him for a view of his calendar. The system does however permit the calendar owner to display or print his own calendar selectively at specified security access levels.

Figure 7:
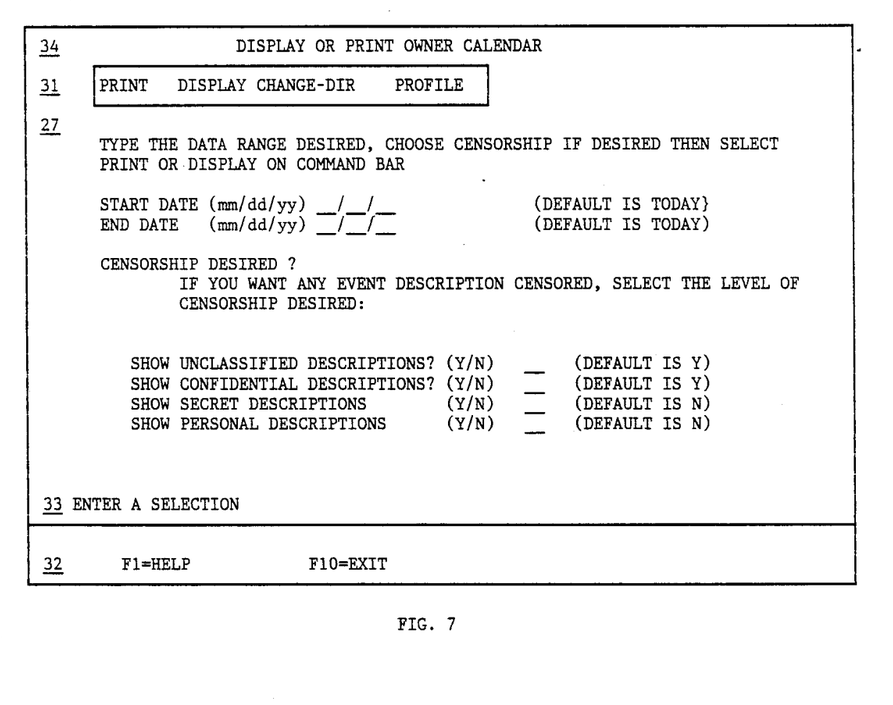
FIG. 7 is a screen presented to a calendar owner to provide a censored copy of his calendar.

FIG. 7 illustrates the screen presented to the calendar ownder when it is desired to display or print a censored copy of his own calendar. FIG. 7 may be presented in response to the user pressing a predetermined Function key or other known techniques. As shown in FIG. 7 the options presented to the calendar owner correspond to the event security classifications. If desired "access permission" levels may be presented as options rather than the specific security classifications.

The following is a list of programming statements which describe the operation of the system in carrying out the method of the present invention. The listing will also assist a person skilled in the art of programming electronic calendaring applications to implement the method of the present invention

```
Check user against the authorization file;
Select;
Case 1 (User is omner);
Show Panel 1;
Set Censorship level (None, Personal, etc. from Panel 1);
Case 2 (Non-owner user with some access permission);
Show Panel X to request date;
Set Censorshiplevel from Authorization file;
Case 3 (Non-owner user with no access permission);
Show Error message "Access Permission Required";
Exit;
End Select;
Do for each day in the day range:
Do for each event of the day:
Read the next event:
Move event start and end times to display or printout:
If event is classified and Censorship level is not none;
If event is personal and Censorship level is personal or
Censorship level is All;
Hide the event description;
If event is Confidential and Censorship level is
Confidential or All;
Hide the event description;
If event is Secret and Censorship level is Secret or
all;
Hide the event description
End if
Move event description (or message) to display or printout
End do
Display or print the day;
End do
Return
```

It will be obvious that various changes and modifications may be made in the details of the method of the present invention without departing from the spirit of the invention or the scope of the appended claims.

I claim:

1. A method for controlling the security of sensitive information entered into an individual electronic calendar by a user of an interactive information handling system having a display device and a keyboard when a day-calendar portion of said calendar containing a plurality of calendared events is displayed, said method comprising the following combination of sequential steps,
    (A) entering one of a plurality of pre-established security classifications into said system at the time that each said event is being calendared,
    (B) automatically developing a security label whenever said day-calendar portion is displayed, said label reflecting the highest security classification assigned to said plurality of events entered on said day-calendar portion, and
    (C) displaying said security label with said day-calendar portion when said portion is displayed.

2. The method recited in claim 1 in which said terminal includes a printer and said step of displaying includes the further step of,
    (A) printing said security label with said printer, on a copy of said day-portion of said calendar that has been printed by said printer.

3. The method recited in claim 1 in which said step of entering includes the further step of,
    (A) keying in a text description of each said event with said keyboard, and
    (B) displaying said text description on said display device.

4. The method recited in claim 3 in which said step of keying in said text description includes the further step of,
    (A) keying in a start and end time for said each said event that is being calendared.

5. The method recited in claim 4 including the further step of,
    (A) storing calendar event data including said start and end time, said text description, and said entered security classification for each said calendared event, and in which said step of automatically developing said security label includes the further step of,
    (B) referencing said stored calendared event data.

6. A method for controlling the security of sensitive information that is included in the descriptions of calendared events that have been entered by individual users, who are calendar owners, into an electronic calendaring application of an interactive information handling system in which each said user has an interactive terminal including a display device and a keyboard for obtaining access to day-calendar portions of his calendar and the calendar of at least one other selected user of the system, said method comprising the following combination of sequential steps,
    (A) entering one of a plurality of pre-established security classifications into said system at the time that an event is being calendared which designates the security level of the data that describes the event, and
    (B) displaying a security label that is automatically developed whenever one of said portions of a calendar maintained by said system, which includes one or more of said calendared events, is displayed, said label indicating a security classification that reflects the highest security classification assigned to said one or more said calendared events being displayed.

7. The method recited in claim 6 further including the step of,
    (A) a first said user requesting to view the events calendared by a second said user for a specified time period, and said step of displaying includes the further step of,
    (B) displaying the requested events on the display device of said first user's terminal.

8. The method recited in claim 7 including the further steps of,
    (A) assigning said first user one of a plurality of access permission levels, and
    (B) censoring any said calendar event data that would be displayed by said step of displaying if said first user has not been assigned the required access permission for said event.

9. The method recited in claim 6 in which said step of displaying includes a further step of,
    (A) censoring selected said calendar events that would normally be displayed to a calendar owner in response to a request by said calendar owner to display a copy of his own calendar with events having designated security classifications censored.

10. The method recited in claim 9 in which said step includes the further step of,
    (A) displaying a screen to said owner to permit said owner to indicate to said system said selected said calendared events to be censored on said requested copy.

* * * * *